(12) United States Patent
Okamoto et al.

(10) Patent No.: US 6,815,109 B2
(45) Date of Patent: Nov. 9, 2004

(54) FUEL CELL SYSTEM

(75) Inventors: Takafumi Okamoto, Koshigaya (JP); Koji Okazaki, Shiki (JP); Shuji Sato, Kawagoe (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 429 days.

(21) Appl. No.: 09/875,574

(22) Filed: Jun. 5, 2001

(65) Prior Publication Data

US 2001/0049042 A1 Dec. 6, 2001

(30) Foreign Application Priority Data

Jun. 5, 2000 (JP) ........................................ 2000-167851

(51) Int. Cl.⁷ ................................................. H01M 8/04
(52) U.S. Cl. ............................ 429/26; 429/24; 429/13; 429/33
(58) Field of Search .............................. 429/12, 13, 22, 429/24, 26, 30, 33, 20, 17

(56) References Cited

U.S. PATENT DOCUMENTS

| | | | |
|---|---|---|---|
| 4,945,010 A | * 7/1990 | Kaufman et al. ............. | 429/26 |
| 6,053,266 A | 4/2000 | Greenhill et al. ........... | 180/65.3 |
| 6,223,843 B1 | 5/2001 | O'Connell et al. ........ | 180/65.3 |
| 6,223,844 B1 | 5/2001 | Greenhill et al. .......... | 180/65.3 |
| 6,492,044 B1 | * 12/2002 | Walsh .......................... | 429/13 |
| 6,605,377 B1 | * 8/2003 | Kimbara et al. .............. | 429/26 |

* cited by examiner

*Primary Examiner*—Bruce F. Bell
*Assistant Examiner*—Monique Wills
(74) *Attorney, Agent, or Firm*—Lahive & Cockfield, LLP; Anthony A. Laurentano, Esq.

(57) ABSTRACT

A fuel cell system comprises a fuel cell stack including stacked power-generating cells, a cooling medium-circulating passage for supplying a cooling medium to the fuel cell stack in a circulating manner to cool the power-generating cells, and a heat exchange means arranged for the cooling medium-circulating passage, for performing a heat exchange treatment for the cooling medium used to cool the power-generating cells, wherein the operation temperature of the fuel cell stack is set to be within a range of 100° C. to 210° C. Accordingly, it is possible to improve durability of the fuel cell system in the high output operation and to easily miniaturize the fuel cell system.

7 Claims, 2 Drawing Sheets

FUEL CELL SYSTEM

BACKGROUND OF THE INVENTION

1. Field of the Invention

The present invention relates to a fuel cell system provided with a fuel cell stack comprising a plurality of power-generating cells each having an electrolyte electrode assembly including an electrolyte interposed between an anode electrode and a cathode electrode, the electrolyte electrode assembly being interposed between separators.

2. Description of the Related Art

The fuel cell such as the solid polymer type fuel cell (SPFC) adopts an electrolyte membrane composed of a polymer ion exchange membrane (cation exchange membrane). The fuel cell comprises power-generating cells each including a membrane electrode assembly (MEA) interposed between separators (bipolar plates), the membrane electrode assembly including an anode electrode and a cathode electrode each principally containing carbon provided opposingly on both sides of the ion exchange membrane. Usually, the fuel cell is used as a fuel cell stack in which a predetermined number of the power-generating cells are stacked and integrally held.

In the above fuel cell stack, a fuel gas such as a gas principally containing hydrogen (hydrogen-containing gas), which is supplied to the anode electrode, contains hydrogen which is ionized into ion on the catalyst electrode, and the ion is moved toward the cathode electrode via the electrolyte. The electron generated in this process is extracted for an external circuit and is utilized as DC electric energy. An oxygen-containing gas such as a gas principally containing oxygen or air (oxygen-containing gas) is supplied to the cathode electrode. Therefore, the hydrogen ion, the electron, and the oxygen are reacted with each other on the cathode electrode, and thus water is produced.

In the fuel cell which uses an electrolyte layer containing water impregnated in a polymer ion exchange membrane such as Nafion 112 (produced by Du Pond), the hydrogen ion conductivity in the electrolyte layer greatly depends on the water content of the electrolyte layer. In the above case, it is necessary to hold liquid water in the electrolyte layer. Therefore, it is impossible to set the power generation temperature (operation temperature) of the fuel cell to be not less than the boiling point of liquid water. Usually, the power generation temperature is controlled to be not more than 80° C. to 90° C.

A variety of cooling structures are used in order to control the power-generating cell to be at a predetermined power generation temperature as described above. For example, one of the cooling structures is of a circulating type in which deionized water or pure water or a mixture liquid composed of deionized water or pure water and ethylene glycol is used as a cooling medium. The cooling medium is introduced into the fuel cell stack to cool the power-generating cell. Next, the cooling medium is cooled to a predetermined temperature by performing heat exchange with a radiator or the like provided at the outside of the fuel cell stack. The cooling medium is supplied again into the fuel cell stack in a circulating manner.

However, in the above-described fuel cell stack, the power generation temperature is set to be not more than 80° C. to 90° C. Therefore, the temperature of the cooling medium discharged from the fuel cell stack, i.e., the temperature on the side of the cooling medium inlet of the radiator is lower than 80° C. to 90° C. By contrast, the temperature of the atmospheric air supplied to the radiator is about 40° C. Therefore, the difference between the temperature of the cooling medium and the temperature of the atmospheric air is small, i.e., not more than 40° C. to 50° C.

Under these circumstances, it is necessary to use a considerably large radiator to effectively cool the cooling medium. When the maximum output of the fuel cell stack is maintained, it is specifically necessary to greatly increase a capacity of the radiator in comparison with a currently used radiator for an automobile of an internal combustion engine type. Then, there is a problem that the size of the entire equipment becomes inevitably large and it is considerably difficult to establish a layout when the fuel cell stack is incorporated into a body of an automobile.

SUMMARY OF THE INVENTION

It is a principal object of the present invention to provide a fuel cell system which makes it possible to effectively maintain high output operation and which makes it possible to miniaturize the fuel cell system with ease.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
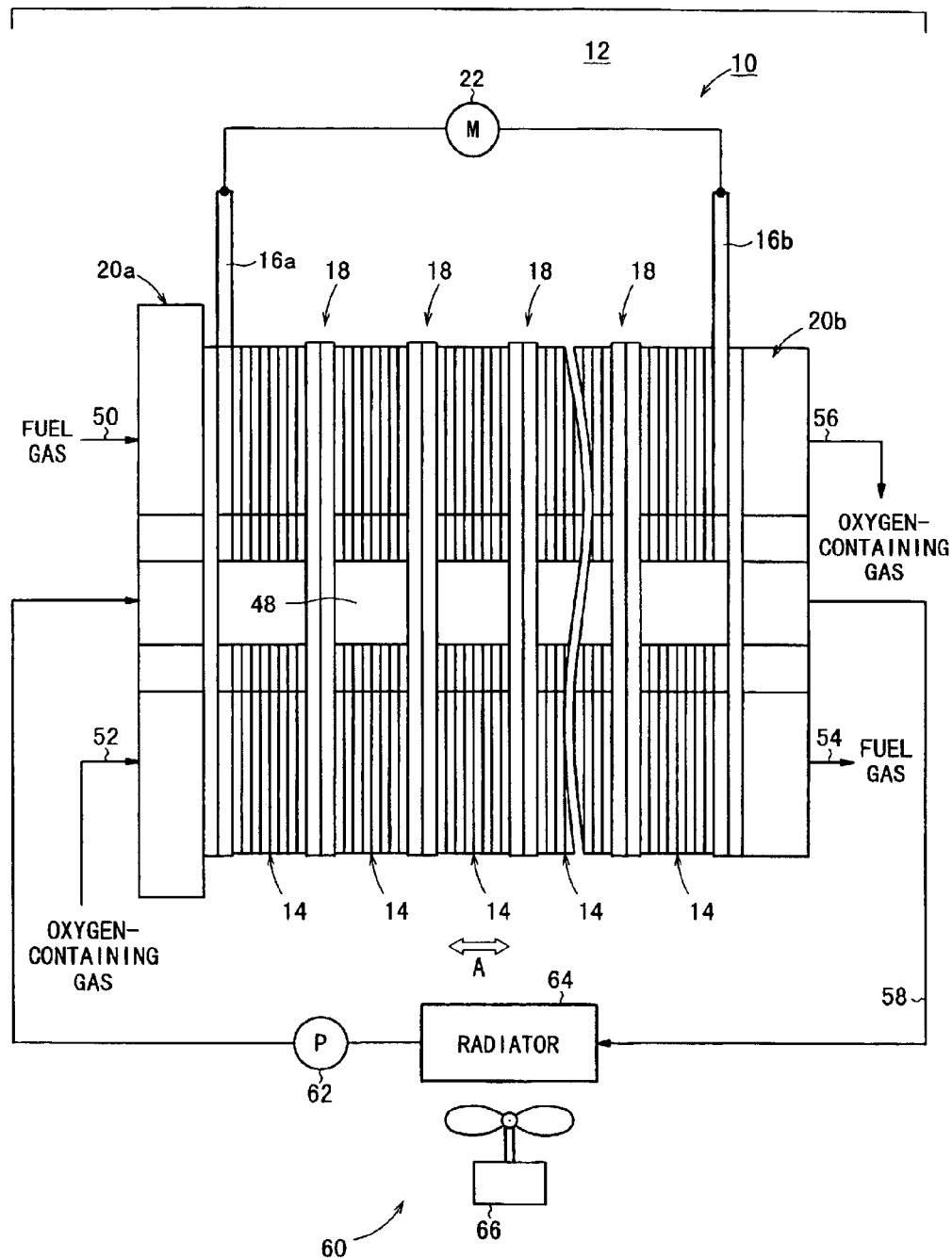
FIG. 1 illustrates a schematic arrangement of a fuel cell system into which a fuel cell stack according to an embodiment of the present invention is incorporated.

FIG. 1 illustrates a schematic arrangement of a fuel cell system 12 into which a fuel cell stack 10 according to an embodiment of the present invention is incorporated.

The fuel cell stack 10 comprises power-generating cells 14. A predetermined number of the power-generating cells 14 are stacked in a direction of an arrow A. Collecting electrodes 16a, 16b which are electrically and integrally connected to the power-generating cells 14 are arranged on both ends sides in a direction of stacking the power-generating cells 14. A predetermined number of cooling cells 18 are interposed between the collecting electrodes 16a, 16b. End plates 20a, 20b are arranged at the outside of the collecting electrodes 16a, 16b. The end plates 20a, 20b are tightened by means of unillustrated tie rods, and thus the power-generating cells 14, the collecting electrodes 16a, 16b, and the cooling cells 18 are tightened and held in the direction of the arrow A in an integrated manner. For example, a load 22 such as a motor is connected to the collecting electrodes 16a, 16b.

Figure 2:
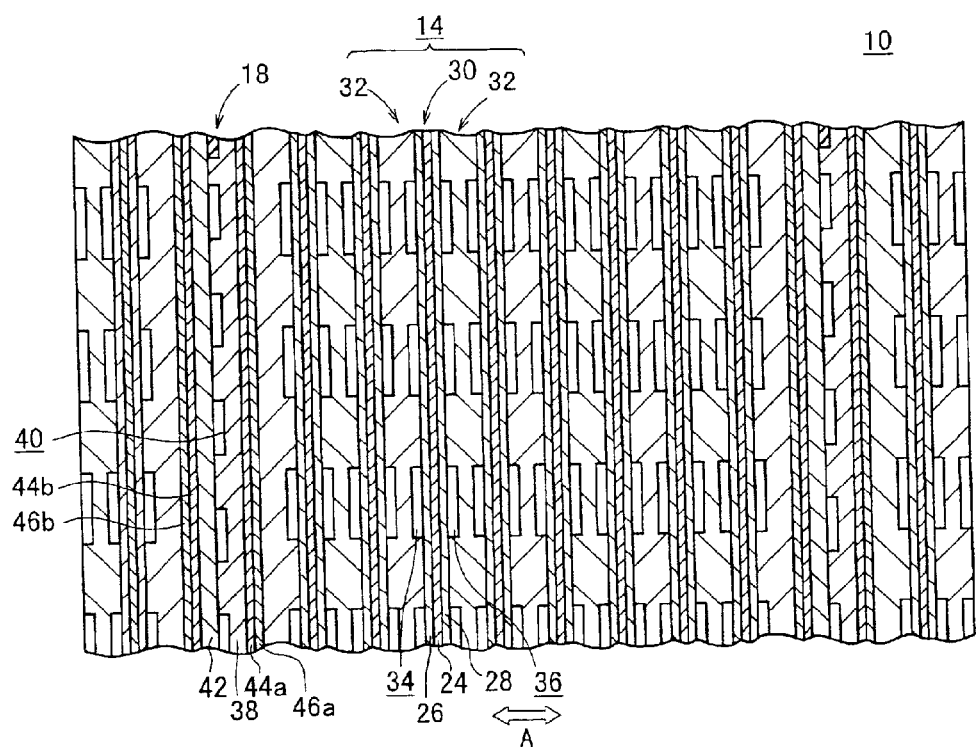
FIG. 2 illustrates an internal arrangement of the fuel cell stack.

The power-generating cell 14 is a phosphoric acid fuel cell (PAFC) in which the driving (operation) temperature is set to be within a range of 100° C. to 210° C. As shown in FIG. 2, the power-generating cell 14 has an electrolyte electrode assembly 30 including a cathode electrode 26 and an anode electrode 28 which are arranged on both sides of an electrolyte (electrolyte layer) 24 containing phosphoric acid held in a matrix of basic polymer, especially polybenzimidazole. Each of the cathode electrode 26 and the anode electrode 28 is arranged with a gas diffusion layer composed of, for example, porous carbon paper as a porous layer. A pair of separators 32 are arranged on both sides of the electrolyte electrode assembly 30. Thus, the power-generating cell 14 is constructed.

An oxygen-containing gas flow passage 34 is formed on a first surface of the separator 32 opposed to the cathode electrode 26. A fuel gas flow passage 36 is formed on a second surface of the separator 32 opposed to the anode electrode 28. The oxygen-containing gas flow passage 34 and the fuel gas flow passage 36 are provided to extend in the vertical direction while meandering in the horizontal direction.

The cooling cells 18 are provided at intervals of eight cells in the fuel cell stack 10. That is, the cooling cells 18 are stacked while arranging eight of the power-generating cells 14 between the cooling cells 18. The cooling cell 18 comprises a flow passage plate 38, a lid plate 42 which is superimposed on the flow passage plate 38 to form a cooling medium passage 40, insulating sheets 44a, 44b which are provided to electrically insulate the cooling medium supplied to the cooling medium passage 40 from the power-generating cells 14, and conducting plates 46a, 46b which are provided to electrically connect the power-generating cells 14 with each other with the cooling cell 18 intervening therebetween. A cooling medium tube passage 48 is arranged between the respective cooling cells 18 (see FIG. 1). The cooling medium passages 40 in the cooling cells 18 communicate with each other via the cooling medium tube passage 48.

As shown in FIG. 1, a fuel gas supply passage 50 for supplying the fuel gas and an oxygen-containing gas supply passage 52 for supplying the oxygen-containing gas are provided for the end plate 20a. A fuel gas discharge passage 54 for discharging the unused fuel gas and an oxygen-containing gas discharge passage 56 for discharging the unused oxygen-containing gas are provided for the end plate 20b.

The fuel cell system 12 comprises the fuel cell stack 10 which is constructed as described above, a cooling medium-circulating passage 58 which supplies the cooling medium to the fuel cell stack 10 in a circulating manner to cool the power-generating cell 14, and a heat exchange means 60 which is arranged for the cooling medium-circulating passage 58 to cool the cooling medium having been used to cool the power-generating cell 14 at the outside of the fuel cell stack 10.

A pump 62 for supplying a predetermined amount of the cooling medium to the fuel cell stack 10 is arranged for the cooling medium-circulating passage 58. The heat exchange means 60 comprises a radiator 64 for an automobile of an internal combustion engine type, and a fan 66 arranged opposingly to the radiator 64. A cooling liquid generally used for the automobile of an internal combustion engine type is also used for the cooling medium.

The operation of the fuel cell system 12 constructed as described above will now be explained below.

The fuel gas such as the gas containing hydrogen obtained by reforming hydrocarbon or pure hydrogen from a hydrogen bomb or a hydrogen storage alloy is supplied via the fuel gas supply passages 50 into the fuel cell stack 10. The gas containing oxygen (air) as the oxygen-containing gas is also supplied via the oxygen-containing gas supply passages 52 into the fuel cell stack 10. Further, the cooling medium for cooling the power-generating surfaces of the power-generating cells 14 is supplied via the cooling medium-circulating passage 58.

As shown in FIG. 2, the fuel gas is supplied to the end plate 20a and is supplied further to the fuel gas flow passage 36 formed on the second surface side of the separator 32. The fuel gas is moved in the direction of the gravity while meandering in the horizontal direction along the fuel gas flow passage 36. Then, the hydrogen gas in the fuel gas is supplied to the anode electrode 28 of the power-generating cell 14. The unused fuel gas is discharged to the fuel gas discharge passage 54 provided for the end plate 20b.

By contrast, the oxygen-containing gas is supplied to the end plate 20a and is introduced into the oxygen-containing gas flow passage 34 formed on the first surface side of the separator 32. The oxygen-containing gas is moved in the direction of the gravity while meandering in the horizontal direction along the oxygen-containing gas flow passage 34. Then, the oxygen gas in the air is supplied to the cathode electrode 26. The unused air is discharged to the oxygen-containing gas discharge passage 56 provided for the end plate 20b. Accordingly, the power is generated in the power-generating cells 14 and is supplied to the load 22 such as a motor (see FIG. 1).

Further, the cooling medium is circulated along the cooling medium-circulating passage 58 under the driving action of the pump 62. The cooling medium is introduced into the cooling cells 18 of the fuel cell stack 10. As shown in FIG. 2, in the cooling cell 18, the cooling medium is supplied to the cooling medium passage 40 formed between the flow passage plate 38 and the lid plate 42. The cooling medium cools the power-generating surface of the power-generating cell 14 and is returned to the cooling medium-circulating passage 58. As shown in FIG. 1, the cooling medium having been used to cool the power-generating cells 14 is introduced into the radiator 64, and it is subjected to heat exchange with the atmospheric air. Further, the cooling medium is subjected to heat exchange under the blowing action of the fan 66, if necessary. Next, the cooling medium is supplied to the inlet side (side of the end plate 20a) of the cooling medium tube passage 48 in the fuel cell stack 10 by the aid of the pump 62. Further, the cooling medium is distributed to the respective cooling cells 18, and it is discharged to the outlet side (side of the end plate 20b) of the cooling medium tube passage 48 via the cooling medium passage 40. The cooling medium is returned to the radiator 64 via the cooling medium-circulating passage 58.

The embodiment of the present invention provides the power-generating cells 14 which are phosphoric acid fuel cells in which the operation temperature is set to be within the range of 100° C. to 210° C. The upper limit of the temperature on the side of the cooling medium outlet is controlled to be in the vicinity of 110° C. to 130° C. when the cooling medium, which is supplied to the cooling cells 18 to cool the power-generating cells 14, is discharged from the fuel cell stack 10. In the above arrangement, it is possible to shorten the distance between the cooling medium outlet of the fuel cell stack 10 and the cooling medium inlet of the radiator 64. The temperature of the cooling medium is then prevented from decreasing between the cooling medium outlet of the fuel cell stack 10 and the cooling medium inlet of the radiator 64. Thus, it is possible to set the upper limit of the temperature on the cooling medium inlet side of the radiator 64 to be 100° C. to 130° C.

In the radiator 64, the cooling medium having the upper limit temperature of 100° C. to 130° C. is subjected to heat exchange with an atmospheric air having a temperature of about 40° C. The cooling medium is then effectively cooled and is discharged from the radiator 64. The cooling medium having been cooled to a predetermined temperature such as 100° C. is thus supplied to the cooling cells 18 of the fuel cell stack 10.

As described above, the embodiment of the present invention sets the upper limit of the temperature on the cooling medium inlet side of the radiator 64 to be 100° C. to 130° C., more preferably 130° C. Therefore, the temperature of the cooling medium is greatly different from that of the atmospheric air. The heat exchange operation for the cooling medium is then effectively performed by the radiator 64 of a small capacity. Specifically, the fuel cell stack 10 can be reliably cooled to a desired operation temperature even when the high output operation is maintained. Thus, the durability of the fuel cell stack 10 is effectively improved and the entire fuel cell system 12 can be miniaturized with ease.

The radiator 64 of the present invention can be a usual radiator for the automobile of an internal combustion engine type, thereby being widely usable, economic, and highly reliable. Then, the radiator 64 is miniaturized all at once in comparison with a structure using a solid polymer type fuel cell, thereby avoiding a problem of a layout when the fuel cell system 12 is incorporated into an automobile body. Thus, the operation of attaching the fuel cell system 12 is greatly improved.

Further, the power-generating cell 14 in the embodiment of the present invention is provided with the electrolyte 24 in which phosphoric acid is held by the matrix of the basic polymer, especially polybenzimidazole. Thus, the entire fuel cell stack 10 can be light and miniaturized with ease.

Although the embodiment of the present invention has been explained by using the phosphoric acid fuel cell as the fuel cell stack 10, it is possible to use a variety of fuel cell stacks as well if the operation temperature of the fuel cell stack 10 is set to be within the range of 100° C. to 210° C.

The temperature in the fuel cell system of the present invention can be set to be relatively high when the cooling medium having been used to cool the power-generating cells is introduced into the heat exchange means. The efficient operation of the heat exchange is then performed by the aid of the heat exchange means. Thus, it is not necessary to increase the capacity of the heat exchange means and the entire heat exchange means can be effectively miniaturized. In addition, it is possible to easily improve the durability of the heat exchange means even when the fuel cell system is operated to generate the high output.

What is claimed is:

1. A fuel cell system comprising:
    a fuel cell stack provided with a plurality of stacked power-generating cells each having an electrolyte electrode assembly including an electrolyte interposed between an anode electrode and a cathode electrode, said electrolyte electrode assembly being interposed between separators;
    a cooling medium-circulating passage for supplying a cooling medium to said fuel cell stack in a circulating manner to cool said power-generating cells; and
    a heat exchange means arranged for said cooling medium-circulating passage, for cooling said cooling medium having been used to cool said power-generating cells, at the outside of said fuel cell stack wherein the heat exchange means sets of a temperature of a cooling medium on an inlet of said heat exchange means to be 100° C.–130° C., wherein:
    an operation temperature of said fuel cell stack is set to be within a range of 100° C. to 210° C.

2. The fuel cell system according to claim 1, wherein:
    cooling cells are installed at intervals of a plurality of said power-generating cells intervening therebetween in a direction of stacking said power-generating cells; and
    said cooling cell has a cooling medium passage provided in a direction of a surface of said cooling cell.

3. The fuel cell system according to claim 1, wherein said fuel cell stack is a phosphoric acid fuel cell stack.

4. The fuel cell system according to claim 3, wherein said power-generating cell is provided with an electrolyte layer containing phosphoric acid held by polybenzimidazole.

5. The fuel cell system according to claim 1, wherein said heat exchange means is provided with a radiator for an automobile having an internal combustion engine, and said cooling medium is a cooling liquid for said automobile having an internal combustion engine to be cooled by said radiator for said automobile.

6. The fuel cell system according to claim 5, wherein said heat exchange means is provided with a fan arranged opposingly to said radiator for said automobile having an internal combustion engine.

7. A fuel cell system comprising:
    a fuel cell stack provided with a plurality of stacked power-generating cells each having an electrolyte electrode assembly including an electrolyte interposed between an anode electrode and a cathode electrode, said electrolyte electrode assembly being interposed between separators;
    a cooling medium-circulating passage for supplying a cooling liquid to be cooled by a radiator of an automobile having internal combustion engine to said fuel cell stack in a circulating manner to cool said power-generating cells; and
    a heat exchange means arranged for said cooling medium-circulating passage and provided with the radiator for the automobile having an internal combustion engine, wherein the heat exchange means is provided for cooling said cooling liquid having been used to cool said power-generating cells, at the outside of said fuel cell stack, wherein the heat exchange means sets a temperature of cooling medium on an inlet of said heat exchange means to be between 100° C.–130° C., and
    an operation temperature of said fuel cell stack is set to be within a range of 100° C. to 210° C.

* * * * *